July 26, 1938.   T. A. DICKS   2,124,548
PROPELLER
Filed July 26, 1937   2 Sheets-Sheet 2
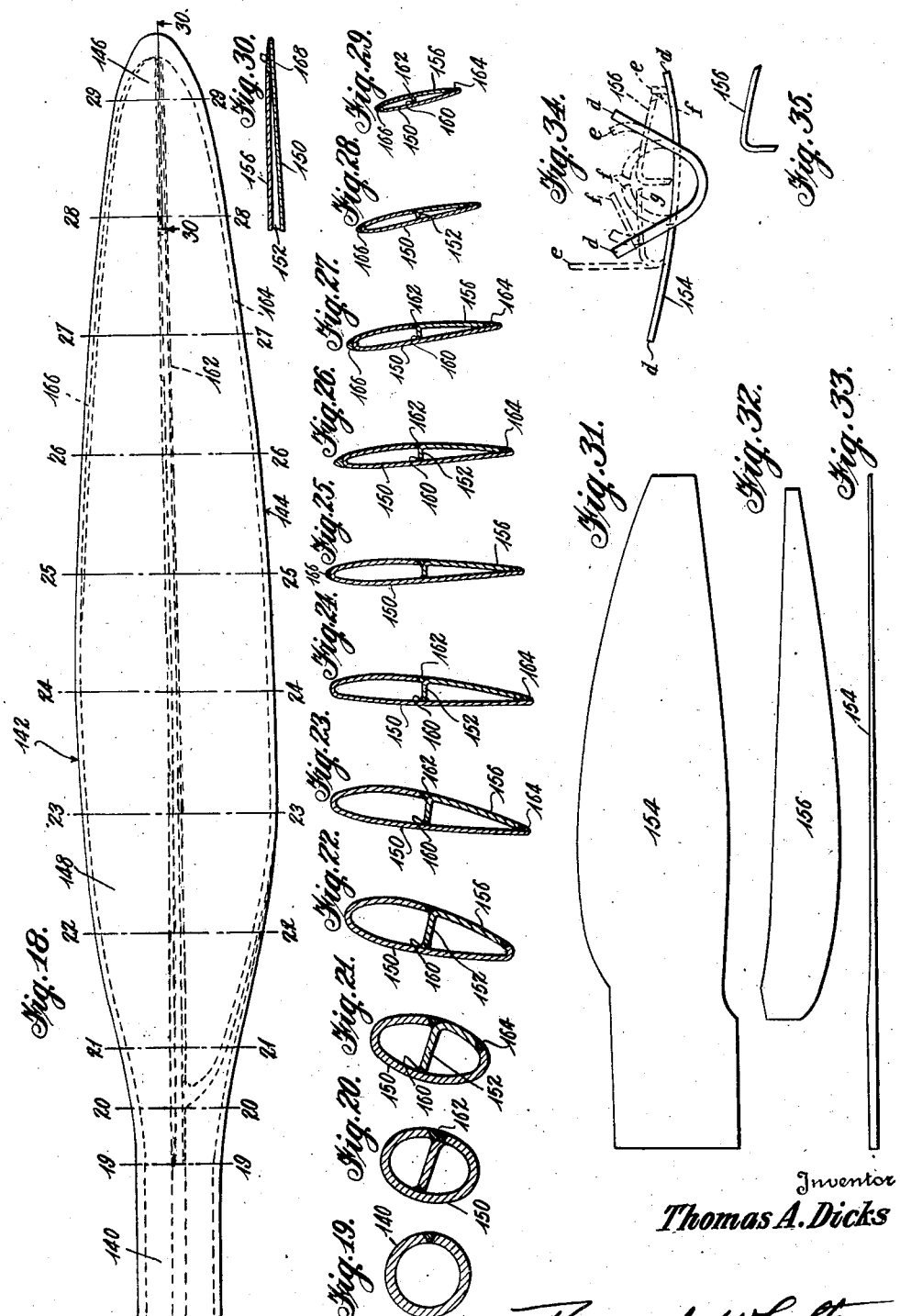
Inventor
Thomas A. Dicks Patented July 26, 1938

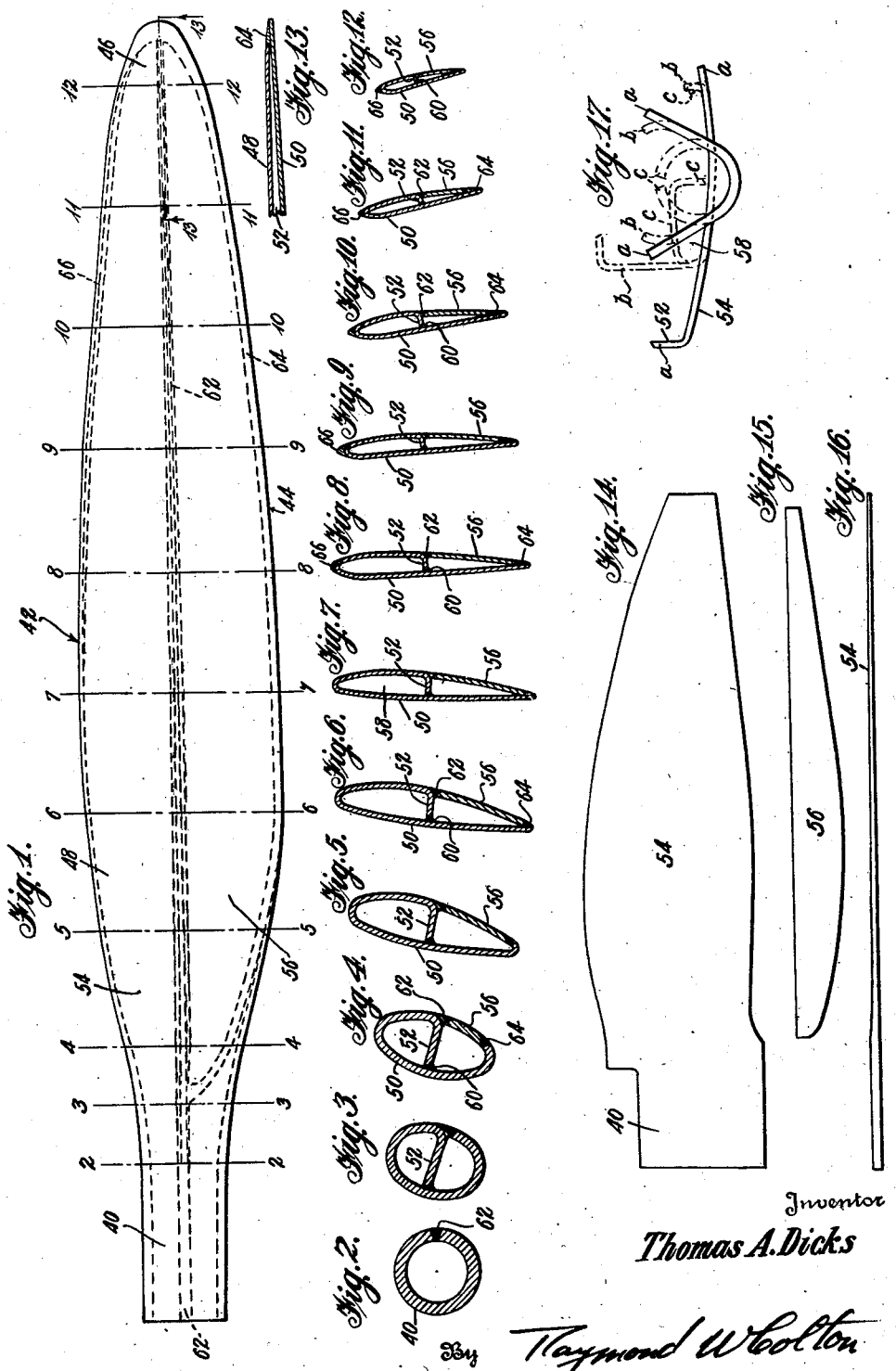

2,124,548

UNITED STATES PATENT OFFICE 2,124,548

PROPELLER

Thomas A. Dicks, Pittsburgh, Pa.

Application July 26, 1937, Serial No. 155,770

24 Claims. (Cl. 170—159)

The present invention relates to aircraft propellers and particularly to the construction and method of making reinforced hollow blades for such propellers.

Without regard to the excessive strains and fractures to which they subjected the metals used, a number of prior inventors have employed folded or lapped edges in the construction of hollow propeller blades from sheet metal. As the result, such blades have invariably failed under the tests to which they are subjected in accordance with the rigid requirements of today. Other inventors have constructed sheet metal blades containing rivets and seams at their leading edges, or alternatively have formed welded joints in such positions that the welding metal constitutes the leading edge.

The present inventor in his own Patent 1,713,500, granted on May 14, 1929, partially overcame some of these disadvantages of the then prior art, but even then he did not entirely remove the welding from the vicinity of the leading edge of the blade, nor did he find it feasible to form the exposed joints in the camber face of the blade.

Many efforts have also been made to provide suitable reinforcing ribs for hollow sheet metal propeller blades but no constructions have resulted thus far which can meet modern tests or stand up in practice. Due to the bellows effects produced in hollow blade propellers, there is a decided need for reinforcement of some kind, yet in all constructions proposed thus far there has been a marked tendency for the blade walls to become loosened and ultimately pull away from the edges of the reinforcing ribs. In his own prior patent above referred to, this inventor disclosed a reinforcing rib having one edge entirely welded to the inner wall of one face of the blade, and having its other edge fastened by spaced inlays formed of welding metal added through openings in the other face of the blade. Experience has shown such a construction to be inadequate to meet present day needs due to the forces and vibration accompanying the greatly increased speed and power.

A rather early attempt to produce a reinforced hollow metal blade is described in the art wherein sheet metal used in forming the blade is of uniform thickness throughout and the internal reinforcing construction is highly complicated, depending upon the use of rivets, rods and struts, and requiring an entirely separate hub construction. Various modifications in this early development involving one-piece constructions, require sharp bending of the sheet metal, the objections to which have already been mentioned, while other modifications contain so many elements and joints that they are inherently costly yet weak, and are further undesirable in that they contain joints at the leading edges of the blades.

It is with a view towards overcoming these inherent disadvantages and objections referred to in the foregoing that the present invention has been proposed. By the present construction, a reinforced sheet metal propeller blade is formed preferably from two plates or sheets of metal which are first shaped into blanks of suitable contour and taper, then pressed or otherwise bent and suitably joined to form the complete blade, including the reinforcing rib, the root end, the pressure face, the camber face, the leading edge, the trailing edge and the tip. One of the blanks serves in the formation of one entire face, the leading edge and a portion of the second face while the second blank serves to complete the second face; the internal reinforcing rib is integral with one of the blanks and is preferably formed thereon during the pressing or bending operations. After partially completing these bending operations, the rib is welded throughout its length to the inner surface of that wall of the blade which is continuous, whereupon the bending is completed and the contiguous edges of the two blanks are welded together.

It is preferably, though not necessarily, the camber face on which these welded joints between the two plates or blanks are formed, and accordingly the inner surface of the pressure face which is continuous and to which the internal reinforcing rib is securely welded.

In order to avoid excessive folding and consequent development of fractures in the metal constituting the blade, the bend at the leading edge is made with a radius which is relatively large as compared with the thickness of the metal. In view of the fact that the metal of both blanks is tapered from the root end towards the tip of the blade, the radius of the bend at the leading edge may become progressively smaller as it approaches the tip. Since the minimum safe radius which may be imparted to the leading edge may in some cases be in excess of that assuring a proper airfoil, it is further proposed by the present invention to add welding metal to the exterior surface of the leading edge. In this way there is formed a built-up construction of welding metal, which may be subsequently ground and polished to define the leading edge of the blade.

The joint at the sharper portions of the trailing edge of the blade is formed by terminating the edge of the smaller blank a slight distance from the edge of the larger blank and adding welding metal to fill the gap thus formed, the joint being finished so that the weld lies entirely within the confines of the face of the blade.

A more detailed understanding of the present invention and its objects will be possible by referring to the accompanying drawings.

Fig. 1 is a plan view of the propeller blade constructed in accordance with the present invention, the welded joints and metal thicknesses being indicated in broken lines;

Figs. 2 to 12 are sections taken along lines 2—2 to 12—12 respectively of Fig. 1;

Fig. 13 is a fragmentary longitudinal section taken along line 13—13 of Fig. 1;

Fig. 14 is a plan of one of the blanks used in constructing the blade of Fig. 1;

Fig. 15 is a plan of the complementary blank used in conjunction with the blank of Fig. 14 for constructing the blade of Fig. 1;

Fig. 16 is an elevation of the blank of Fig. 14;

Fig. 17 is a diagrammatic showing of certain of the steps performed in the process of completing the blade;

Figs. 18 to 34 are analogous to Figs. 1 to 17 respectively, of a modified form of construction wherein the smaller complementary blank of Fig. 32 serves to form the reinforcing rib for the blade; and Fig. 35 is an end elevation of the rib forming blank in condition to be assembled.

The hollow sheet metal propeller blade shown in Fig. 1 of the drawings comprises a root end 40, a leading edge 42, a trailing edge 44, a tip 46, a camber or suction face 48, and as shown in the sectional views, a pressure or working face 50.

As will appear from the sections shown in Figs. 3 to 12, the blade is provided with an internal reinforcing rib 52 which extends the full length of the working portion of the blade, namely from the round portion of the root end to the tip. This reinforcing rib is integral with one of the blanks used for forming the blade and has its edge welded to the internal wall of one of the blade faces.

The blade conforming to the modification of Figs. 1 to 17 is constructed from two blanks 54 and 56 shown in Figs. 14 and 15 respectively. The larger blank in this case serves to form the entire pressure face, the leading edge, a portion of the camber face, the reinforcing rib and the root of the blade, while the smaller blank serves to complete the camber face. These blanks are tapered so that their thickness decreases progressively towards the tip of the blade as will be apparent by reference to Fig. 16 of the drawings which shows an elevation of the larger blank 54 of Fig. 14. In order to provide the necessary strength at the hub, the root end of the blade may be of uniform thickness, so that consequently the taper will actually extend from the root end to the tip. It will be understood that the smaller blank 56 is similarly tapered from the root end to the tip of the blade.

The steps in forming the blade from the two blanks may follow in the order diagrammatically depicted in Fig. 17 of the drawings. The blank 54 may first be bent sufficiently for its ends to assume the positions designated a in Fig. 17, during which operation the rib 52 is formed. In a subsequent bending or pressing operation, the blank may be still further bent to the positions depicted at b, following which the final bending may be accomplished by bringing the ends of the blank to the positions marked c under which conditions the reinforcing rib comes into close proximity with the internal surface of the continuous pressure face defined during this bending operation. Sectional mandrels or forms may be inserted in the hollow cell 58 defined by the rib 52 during the bending operation to support the plate during its contact with the forming dies. Such mandrels will be removed of course, after the forming and welding operations have been completed.

After the blank 54 has assumed the positions indicated at c in Fig. 17, the edge of the rib 52 will be rigidly secured to the inner surface of the wall defining the pressure face of the blade by means of a weld 60 extending the entire length of the rib. As will be apparent from Figs. 3 to 12 of the drawings, this rib extends from the round portion of the root end of the blade to the tip, and is substantially medial of the blade.

The final form may now be imparted to the blank 56 by means of suitable dies, whereupon the blank will be in condition to close the gap in the larger blank and thus complete the camber face of the blade.

The smaller blank 56 thus formed is placed in position with respect to the larger blank for the necessary welding operations, during which it may be supported by means of sectional forms or mandrels which will later be removed. The welding will extend around the entire periphery of the smaller blank and will in effect comprise two substantially longitudinal welds 62 and 64, the former extending approximately centrally of the camber face of the blade, the latter being formed at the trailing edge and securing the edge of the smaller blank to the rear surface of the larger blank.

In view of the fact that the radius of the bend at the leading edge of the blade is maintained sufficiently large to prevent fracture at this point, it is sometimes necessary to provide a sharper external contour near the tip of the blade in order to achieve the desired airfoil. This is accomplished in the present case by building up the leading edge at the necessary points as shown in Figs. 1 and 8 to 12 inclusive, by adding welding metal 66 following which the surface may be suitably ground and polished to arrive at the form finally desired. At the tip of the blade, this added welding metal 66 will merge into the welding metal 64 which is added to join the blanks together, the tip construction being evident upon reference to Fig. 13 of the drawings.

The metal 66 added to the leading edge may possess greater resistance characteristics than the metal constituting the blanks, making possible a harder, stronger and more resistant blade. Such properties as resistance to corrosion, wear and fatigue are contemplated in this connection for which purpose, some of the chromium-steel alloys, for example, may serve advantageously.

The weld 62 between the two blanks has been shown as continuing to join the edges of the larger blank at the root end of the blade. It will be understood however that the weld at the root end may be effected simultaneously with the welding of the two blanks or by an entirely separate step.

The modification shown in Figs. 18 to 35 inclusive differs primarily from the form already described in that the reinforcing rib is integral with the smaller blank instead of being integral with the larger blank. As shown in Fig. 18, the blade 75 of this modification is provided with a root end 140, a leading edge 142, a trailing edge 144, a tip 146, and camber face 148 and as will appear from the sectional views a pressure face 150.

In this case, the rib 152 is formed as an integral part of the smaller blank 156 shown in Fig. 32, while the larger blank 154 as shown in Fig. 31, serves to form the root end of the blade, the entire pressure face, the leading edge and a portion of the camber face.

In the present modification also, the blanks are formed with tapering sections as illustrated in Fig. 33, the elevation being that of the larger blank. It is to be understood however that the smaller blank 156 is tapered as well so that as in the modification of Figs. 1 to 17, the rib 152 will also taper, becoming progressively smaller towards the tip of the blade.

In forming the blanks of the present construction, reference being had to Fig. 34 of the drawings, the blank 154 may first be formed with its parts in the position indicated by d, following which a further pressing or bending operation imparts to the elements the positions indicated at e. A subsequent bending or pressing operation causes the parts to assume the positions depicted at f in Fig. 34 of the drawings, whereupon the smaller blank 156 is pressed or otherwise conformed to its ultimate shape as shown in Fig. 35 of the drawings, and then inserted in its position with respect to the larger blank as shown in Fig. 34 and welded thereto. A weld 160 secures the entire edge of the rib to the inner surface of the continuous blade wall defining the pressure face, which weld will extend from the round portion of the root end of the blade to its tip as will be apparent by reference to Fig. 18 of the drawings.

Having joined the rib to the blank 154, the end of the blank 154 is bent into its final position depicted at g in Fig. 34 so that it may now be welded to the contiguous portion of the blank 156.

The use of suitable forms or mandrels during the pressing and welding operations is of course contemplated, which forms or mandrels will be removed after such operations have been completed. Having assembled the parts of the blade, the welds 162 and 164 joining the blank medially of the camber face and at the trailing edge thereof respectively, will be effected in much the manner of the welding at the points 62 and 64 respectively in the modification described with respect to Figs. 1 to 17. Likewise, in this case the desired airfoil may be achieved by the addition of suitable welding metal 166 to the leading edge of the blade followed by necessary grinding and/or polishing to impart thereto the desired finish. The junction of the welds 164 and 166 at the tip of the blade is depicted at 168 in Fig. 30 of the drawings.

While only two specific embodiments of the invention have been described, these have been by way of illustration and not by way of limitation. Accordingly, this invention should not be restricted beyond the scope of the appended claims.

I claim:—

1. A propeller blade comprising a sheet of metal defining one face, one edge and a portion of the second face of the blade, a second sheet of metal welded to the first said sheet and completing said second face, and a rib integral with one of said sheets extending from the junction of the sheets to the opposed portion of said first sheet.

2. A propeller blade comprising a sheet of metal defining the pressure face, the leading edge and a portion of the suction face of the blade, a second sheet of metal welded to the first said sheet and completing the suction face, and a rib integral with one of said sheets extending from their junction to the opposed portion of said first sheet.

3. A propeller blade comprising a sheet of metal defining one face, one edge and a portion of the second face of the blade, a second sheet of metal welded to the first said sheet and completing said second face, and a rib integral with the first of said sheets extending from the junction of the sheets to the opposed portion of said first sheet.

4. A propeller blade comprising a sheet of metal defining one face, one edge and a portion of the second face of the blade, a second sheet of metal welded to the first said sheet and completing said second face, and a rib integral with the second of said sheets extending from the junction of the sheets to the opposed portion of said first sheet.

5. A propeller blade comprising a sheet of metal defining one face, one edge, a portion of the second face and the root of the blade, a second sheet of metal welded to the first said sheet and completing said second face, and a rib integral with one of said sheets extending from the junction of the sheets to the opposed portion of said first sheet.

6. A metal propeller blade comprising a leading edge whose external contour is defined by added metal welded to the metal of the blade itself.

7. A metal propeller blade comprising a leading edge whose external contour is defined by added metal welded to the metal of the blade itself having a higher resistance characteristic than the metal constituting the remainder of the blade.

8. A sheet metal propeller blade comprising two metal plates of varying thickness; the first of said plates defining the entire pressure face, the leading edge, a portion of the camber face, an internal reinforcing rib and the root of the blade; the second plate completing the camber face and welded to said first plate.

9. A sheet metal propeller blade comprising two metal plates of varying thickness; the first of said plates defining the entire pressure face, the leading edge, a portion of the chamber face and the root of the blade; the second plate completing the camber face and defining an internal reinforcing rib; said plates being welded together.

10. A sheet metal propeller blade comprising: a first plate defining the pressure face, the leading edge, a portion of the camber face, the root and an internal reinforcing rib; a second plate welded to the first said plate and completing said camber face; said rib extending from said root to the tip of the blade.

11. A sheet metal propeller blade comprising: a first plate defining the pressure face, the leading edge, a portion of the camber face and the root; a second plate welded to the first said plate and defining an internal reinforcing rib and completing said camber face; said rib extending from said root to the tip of the blade.

12. A sheet metal propeller blade comprising two plates welded together and defining a root end, a tip, a pressure face, a camber face, a leading edge, a trailing edge and an internal reinforcing rib integral with one of said plates extending from root to tip and from pressure face to camber face.

13. A sheet metal propeller blade comprising two plates defining a root end, a tip, a pressure face, a camber face, a leading edge, a trailing edge and an internal reinforcing rib extending from root to tip and from pressure face to camber face, said plates being joined by welds formed entirely within the limits of the camber face.

14. A sheet metal propeller blade comprising two plates welded together and defining a root end, a tip, a pressure face, a camber face, a leading edge, a trailing edge and an internal reinforcing rib extending from root to tip and from pressure face to camber face, said rib being welded to the internal wall of the pressure face.

15. A sheet metal propeller blade comprising two plates welded together and defining a root end, a tip, a pressure face, a camber face, a leading edge, a trailing edge and an internal reinforcing rib integral with one of said plates extending from root to tip and from pressure face to camber face, said plates decreasing in thickness from said root end to said tip.

16. A sheet metal propeller blade comprising two plates defining a root end, a tip, a pressure face, a camber face, a leading edge, a trailing edge and an internal reinforcing rib extending from root to tip and from pressure face to camber face, said leading edge being formed completely by one of said plates and added metal defining the external contour of said leading edge.

17. A method of manufacturing an aircraft propeller blade comprising forming a tapered blank, bending said blank to define an entire pressure face, leading edge, part of a camber face and an internal reinforcing rib, welding the edge of said rib to the inner surface of the pressure face, forming a second tapered blank to complete the camber face, and welding said blanks together.

18. A method of manufacturing an aircraft propeller blade comprising forming a tapered blank, bending said blank to define an entire pressure face, leading edge and part of a camber face, forming a second tapered blank and bending the same to define an internal reinforcing rib and the remaining part of the camber face, welding the edge of said rib to the inner surface of the pressure face, and welding the blanks together.

19. A method of manufacturing an aircraft propeller blade comprising forming two tapered blanks to define a root, a tip, a camber face, a pressure face, a leading edge, a trailing edge and an internal reinforcing rib, welding said rib to the inner surface of the pressure face and welding said blanks together within the limits of the camber face.

20. A method of forming an edge on a metal propeller blade comprising adding metal thereto by welding.

21. A hollow metal propeller blade comprising a plate forming the leading edge and at least parts of each of the pressure and suction faces, a section of said blade being thicker at the leading edge than at said faces.

22. A hollow metal propeller blade having a section at which the metal thickness at the leading edge exceeds that at any other point of the section.

23. A metal propeller blade comprising a curved leading edge whose radius is reduced by metal welded thereto.

24. A hollow metal propeller blade comprising a plate defining a curved leading edge, a section of said leading edge having an internal radius greater than its external radius.

THOMAS A. DICKS.